US012104740B2

(12) United States Patent
Murphy et al.

(10) Patent No.: US 12,104,740 B2
(45) Date of Patent: Oct. 1, 2024

(54) ELBOWS AND RELATED METHODS (71) Applicant: Distribution International, Inc., Daytona Beach, FL (US)

(72) Inventors: Jeffrey Lynn Murphy, Sulphur, LA (US); Johnathan Adam Miller, Welsh, LA (US)

(73) Assignee: Distribution International, Inc., Daytona Beach, FL (US)

( * ) Notice: Subject to any disclaimer, the term of this patent is extended or adjusted under 35 U.S.C. 154(b) by 937 days.

(21) Appl. No.: 17/068,889

(22) Filed: Oct. 13, 2020

(65) Prior Publication Data

US 2021/0131605 A1 May 6, 2021

Related U.S. Application Data (60) Provisional application No. 62/929,191, filed on Nov. 1, 2019.

(51) Int. Cl.
| | |
|---|---|
| *F16L 43/00* | (2006.01) |
| *B29C 64/393* | (2017.01) |
| *B29D 23/00* | (2006.01) |
| *B33Y 50/02* | (2015.01) |
| *B33Y 80/00* | (2015.01) |
| *B65B 5/10* | (2006.01) |
| *F16L 59/02* | (2006.01) |

(52) U.S. Cl.
CPC .......... *F16L 59/025* (2013.01); *B29C 64/393* (2017.08); *B29D 23/006* (2013.01); *B33Y 50/02* (2014.12); *B33Y 80/00* (2014.12); *B65B 5/10* (2013.01); *F16L 43/00* (2013.01); *F16L 2201/60* (2013.01)

(58) Field of Classification Search
CPC ................................ F16L 59/025; F16L 59/22
See application file for complete search history.

(56) References Cited

U.S. PATENT DOCUMENTS

| | | | | |
|---|---|---|---|---|
| 2,937,662 | A | * | 5/1960 | Green ..................... F16L 59/22 285/133.11 |
| 3,025,176 | A | * | 3/1962 | Herrington ............. C04B 28/14 106/703 |
| 2020/0078981 | A1 | * | 3/2020 | Fay ........................ F16L 59/025 |
| 2020/0080679 | A1 | * | 3/2020 | Fay ........................ F16L 59/029 |
| 2020/0080680 | A1 | * | 3/2020 | Fay ........................... B29C 70/66 |

FOREIGN PATENT DOCUMENTS

DE   102018002065 A1 * 9/2019
GB        864973 A  *  4/1961

* cited by examiner

*Primary Examiner* — Zachary T Dragicevich
*Assistant Examiner* — James A Linford
(74) *Attorney, Agent, or Firm* — Barnes & Thornburg LLP (57) ABSTRACT

A method of manufacturing an insulation elbow can include placing raw material at a processing machine. The method can further include implementing, at the processing machine, insulation elbow processing instructions for creating a plurality of insulation elbow segments from the raw material. Each of the plurality of insulation elbow segments can correspond to the insulation elbow such that the plurality of insulation elbow segments are configured to be assembled to form at least part of the insulation elbow. The method can also include creating, at the processing machine, the plurality of insulation elbow segments from the raw material according to the insulation elbow processing instructions and placing the plurality of insulation elbow segments in a package.

5 Claims, 5 Drawing Sheets

ELBOWS AND RELATED METHODS

RELATED APPLICATION

This application claims priority to U.S. provisional patent application No. 62/929,191, filed Nov. 1, 2019, the contents of which are hereby incorporated by reference.

TECHNICAL FIELD

This disclosure generally describes components and methods relating to conveyance lines. More specifically, this disclosure describes devices and methods pertaining to elbows used for connecting conveyance lines, such as insulation elbows installed around elbows through which fluid is to be conveyed.

BACKGROUND

Piping, tubing, and other forms of conveyance lines are used in a variety of applications to convey matter, such as liquid, from one location to another. Such applications include, for example, processing facilities in the energy sector. Often times, as the conveyance line (e.g., piping) extends from one location to another the conveyance line changes direction. To change conveyance line direction, an elbow can be installed between two lengths of conveyance line. The elbow can be angled, or bend, between its ends to provide the desired change in conveyance line direction.

SUMMARY

In general, various exemplary embodiments relating to conveyance line elbows are disclosed herein. Embodiments include conveyance elbow segments, conveyance elbows assembled from such elbow segments, and methods of manufacturing elbows, such as by creating multiple elbow segments, and methods of installing an elbow, such as by assembling the elbow from multiple elbow segments. Embodiments also include insulation elbows configured to be installed around conveyance elbows through which fluid (e.g., gas, liquid) is to be conveyed. Such embodiments include insulation elbow segments, insulation elbows assembled from such insulation elbow segments, and methods of manufacturing insulation elbows, such as by creating multiple insulation elbow segments, and methods of installing an insulation elbow, such as by assembling the insulation elbow, from multiple insulation elbow segments, around a conveyance elbow.

Previously, insulation elbows installed around the exterior of relatively large conveyance elbows have been manufactured to be a single piece insulation elbow. However, this creates inefficiencies in manufacturing by necessitating the use of many processing machines and requiring a significant amount of manual labor, including moving large insulation elbows from one machine to another. This also creates inefficiencies in storage and transportation as these single piece insulation elbows can be quite large and, thereby, hamper the ability to optimize valuable space. In addition, a relatively large single piece insulation elbow can be difficult to install at many conveyance elbows, often requiring a large number of installers working on scaffolding or other elevated surfaces to lift, position, and secure a single piece, often heavy and bulky, insulation elbow around the large conveyance elbow.

Embodiments disclosed herein can be useful in increasing the efficiency associated with manufacturing, storing, shipping, and installing an insulation elbow as well as increasing insulation elbow quality control. Various embodiments disclosed herein can create multiple insulation elbow segments that, when assembled, form a specified insulation elbow (e.g., so to be installed around a fluid conveyance elbow). Elbows that can be assembled from insulation elbow segments according to the present disclosure can vary in size, including in some cases assembled insulation elbows having an inner diameter of twenty four inches or larger. Producing insulation elbow segments corresponding to a specified insulation elbow can be useful for a number of reasons. This can, for instance, reduce labor needed to manufacture the insulation elbow while also ultimately providing an insulation elbow that can be more efficient and user-friendly to install on site. This can also produce a more consistent insulation elbow by reducing manufacturing tolerances and other inconsistencies between the same insulation elbow products. In addition, this can reduce safety-related risks in manufacturing and provide an insulation elbow that is more ergonomic to handle both on site during manufacturing and packaging as well as in the field during installation.

One exemplary embodiment includes a method of manufacturing an insulation elbow (e.g., an insulation elbow that is configured to be installed around an outer surface of a fluid conveyance elbow). This method embodiment includes implementing insulation elbow processing instructions. The insulation elbow processing instructions can be instructions for creating one or more insulation elbow segments and can specify one or more features of each insulation elbow segment relating to the insulation elbow to be formed from the one or more insulation elbow segments. The method embodiment also includes creating one or more insulation elbow segments according to the insulation elbow processing instructions. To create each of the one or more insulation elbow segments, the insulation elbow processing instructions can be implemented at a processing machine that forms each insulation elbow segment from raw material. The method embodiment further includes, after creating the one or more insulation elbow segments, packaging the insulation elbow segments. Packaging the insulation elbow segments can include placing multiple insulation elbow segments, with two or more of the multiple insulation elbow segments having a unique insulation elbow segment identifier, in the same package.

Another exemplary embodiment includes a method of installing an insulation elbow. This method embodiment includes removing two or more insulation elbow segments from an insulation elbow segment packaging. The method embodiment also includes assembling two or more insulation elbow segments according to insulation elbow segment identifiers included on the two or more insulation elbow segments. For example, insulation elbow segment identifiers can provide an indication as to a specific insulation elbow for which each insulation elbow segment is to be used to assemble as well as an indication as to a relative positioning of each insulation elbow segment, relative to one or more other insulation elbow segments, in the assembly of the specific insulation elbow. Assembling the insulation elbow segments can include placing two, or more, insulation elbow segments at an exterior surface of a conveyance elbow. Assembling the insulation elbow segments can include placing two insulation elbow segments adjacent one another (e.g., at an exterior surface of the conveyance elbow) and securing these two insulation elbow segments together to form at least a portion of the specific insulation elbow. The method embodiment can, in some cases, further includes connecting one or more conveyance lines to the conveyance elbow. For example, the conveyance elbow can have two or more conveyance openings at which two or more conveyance lines are connected.

A further exemplary embodiment includes an insulation elbow assembly. This insulation elbow assembly embodiment includes a first insulation elbow segment, a second insulation elbow segment, a third insulation elbow segment, and a fourth insulation elbow segment. The first insulation elbow segment has a first segment first longitudinal side, a first segment second longitudinal side opposite the first segment first longitudinal side, a first segment first radial side, a first segment second radial side opposite the first segment first radial side, a first segment interior surface, and a first segment exterior surface opposite the first segment interior surface. The second insulation elbow segment has a second segment first longitudinal side, a second segment second longitudinal side opposite the second segment first longitudinal side, a second segment first radial side, a second segment second radial side opposite the second segment first radial side, a second segment interior surface, and a second segment exterior surface opposite the second segment interior surface. The second segment second longitudinal side is secured to the first segment first longitudinal side to form a first segment-second segment joint. The third insulation elbow segment has a third segment first longitudinal side, a third segment second longitudinal side opposite the third segment first longitudinal side, a third segment first radial side, a third segment second radial side opposite the third segment first radial side, a third segment interior surface, and a third segment exterior surface opposite the third segment interior surface. The third segment first radial side is secured to the first segment second radial side to form a first segment-third segment joint. The fourth insulation elbow segment has a fourth segment first longitudinal side, a fourth segment second longitudinal side opposite the fourth segment first longitudinal side, a fourth segment first radial side, a fourth segment second radial side opposite the fourth segment first radial side, a fourth segment interior surface, and a fourth segment exterior surface opposite the fourth segment interior surface. The fourth segment second longitudinal side is secured to the third segment first longitudinal side to form a third segment-fourth segment joint. The fourth segment first radial side is secured to the second segment second radial side to form a second segment-fourth segment joint.

In a further embodiment, the above insulation elbow assembly also includes a fifth insulation elbow segment and a sixth insulation elbow segment. The fifth insulation elbow segment has a fifth segment first longitudinal side, a fifth segment second longitudinal side opposite the fifth segment first longitudinal side, a fifth segment first radial side, a fifth segment second radial side opposite the fifth segment first radial side, a fifth segment interior surface, and a fifth segment exterior surface opposite the fifth segment interior surface. The sixth insulation elbow segment has a sixth segment first longitudinal side, a sixth segment second longitudinal side opposite the sixth segment first longitudinal side, a sixth segment first radial side, a sixth segment second radial side opposite the sixth segment first radial side, a sixth segment interior surface, and a sixth segment exterior surface opposite the sixth segment interior surface. The sixth segment second longitudinal side is secured to the fifth segment first longitudinal side to form a fifth segment-sixth segment joint. And, the fifth segment-sixth segment joint is offset from each of the first segment-second segment joint and the third segment-fourth segment joint.

BRIEF DESCRIPTION OF DRAWINGS

The following drawings are illustrative of particular examples of the present invention and therefore do not limit the scope of the invention. The drawings are intended for use in conjunction with the explanations in the following detailed description where like numerals refer to like features. Examples of the present invention will hereinafter be described in conjunction with the appended drawings.

DETAILED DESCRIPTION

The details of one or more examples are set forth in the accompanying drawings and the description below wherein like numerals refer to like features. Other features, objects, and advantages will be apparent from the description and drawings and from the claims. The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
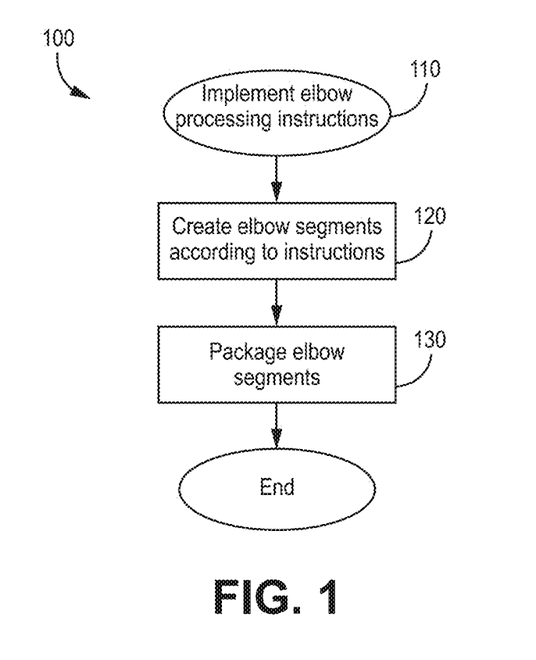
FIG. 1 is a flow diagram of an exemplary embodiment of a method of manufacturing an insulation elbow.

FIG. 1 is a flow diagram illustrating an exemplary embodiment of a method 100 of manufacturing an insulation elbow. In many applications, a conveyance elbow can provide a change in conveyance line (e.g., piping) direction between two lengths of conveyance line (e.g., pipe) that are connected to the conveyance elbow, and the insulation elbow can be placed around, some or all, of the conveyance elbow to provide insulation at the conveyance elbow. In this way, the conveyance elbow can serve to facilitate the change in conveyance line direction while conveying material from one connected length of conveyance line to another connected length of conveyance line, and the insulation elbow can serve to reduce thermal loss at the conveyance elbow. The insulation elbow assembly embodiments disclosed herein, and the insulation elbow segments making up the insulation elbow assembly, can be made from one or more of a variety of materials. For example, the insulation elbow assembly embodiments disclosed herein, and the insulation elbow segments making up the insulation elbow assembly, can be made from, for instance, one or more of Foamglas, Polyisocyanurate, Perlite, Cal-Sil, and Phenolic Foam.

In general, the method 100 can be useful in creating an insulation elbow in a more efficient manner. For example, the method 100 can reduce the labor needed to manufacture the insulation elbow while also ultimately providing an insulation elbow that can be more efficient and user-friendly to install on site. As another example, the method 100 can produce a more consistent insulation elbow by reducing manufacturing tolerances and other inconsistencies between the same insulation elbow products. Also, the method 100 can reduce safety-related risks in manufacturing and provide an insulation elbow that is more ergonomic to handle both on site during manufacturing and packaging as well as in the field during installation. As a final example, the method 100 can produce insulation elbow segments (which can be assembled together to form an insulation elbow) and these insulation elbow segments can make the insulation elbow more efficient to store and ship.

At step 110 of the method 100, insulation elbow processing instructions are implemented. Insulation elbow processing instructions can be instructions for creating one or more insulation elbow segments. Each such insulation elbow segment can be an individual piece of a specified insulation elbow. Accordingly, each insulation elbow segment can be configured to be assembled together with other insulation elbow segments created according to the insulation elbow processing instructions to form a specified insulation elbow. In this way, when multiple, individual insulation elbow segments are ultimately assembled together these insulation elbow segments can form the specified insulation elbow that itself is made up of multiple, individual insulation elbow segments.

The insulation elbow processing instructions for creating one or more insulation elbow segments can be in a variety of forms in various embodiments. As one example, insulation elbow processing instructions can be in the form computer-executable instructions stored in a non-transitory computer-readable storage article. In this example, when these computer-executable insulation elbow processing instructions are executed by a processor at a processing machine the processing machine carries out processing actions according to the insulation elbow processing instructions to create one or more insulation elbow segments from raw material. For instance, when such computer-executable insulation elbow processing instructions are executed by a processor at a processing machine the processing machine can create multiple, individual insulation elbow segments that are configured to be assembled together to form an insulation elbow (e.g., around a conveyance elbow). In another example, the insulation elbow processing can be in the form of operator instructions specifying particulars for each of a number of insulation elbow segments so as to provide an operator of a processing machine with information to create each insulation elbow segment at the processing machine.

The insulation elbow processing instructions can specify one or more features of each insulation elbow segment that relate to the insulation elbow to be formed from the insulation elbow segments. For example, the insulation elbow processing instructions can specify one or more geometric features, for each insulation elbow segment, that are a function of the insulation elbow to be formed from the insulation elbow segments. For each insulation elbow segment, geometric features specified by the insulation elbow processing instructions can include one or more dimensions for the insulation elbow segment that are a function of the dimensions of the insulation elbow to be formed from the insulation elbow segments. For instance, if an insulation elbow to be formed from the insulation elbow segments is to have a specified length, inner diameter, outer diameter, and radius of curvature, for each insulation elbow segment the insulation elbow processing instructions can specify a length proportionately corresponding to the length of the insulation elbow to be formed, a width proportionally corresponding to the inner and outer diameter of the insulation elbow to be formed, and a radius of curvature proportionately corresponding to the radius of curvature of the insulation elbow to be formed. In this way, multiple insulation elbow segments can be created from raw material according to insulation elbow processing instructions that specify features for each insulation elbow segment that correspond to the insulation elbow to be formed by each of the multiple insulation elbow segments.

Insulation elbow processing instructions can be implemented, for example, at a processing machine to create one or more insulation elbow segments. Raw material can be placed at the processing machine and the processing machine can be configured to act upon the raw material to transform the raw material into the one or more specified insulation elbow segments. The processing machine at which the insulation elbow processing instructions are implemented can be a number of various machines suitable for creating specified insulation elbow segments, as desired, in a particular application. Exemplary processing machines can include a Thermwood® CNC machine or other programmable machines capable of processing raw material into a desired insulation elbow segment. In some cases, the processing machine is configured to receive raw material and create one or more specified insulation elbow segments without needing to transfer product, from which the insulation elbow segment is created, to a second machine prior to creating the specified insulation elbow segment. As such, the insulation elbow segment can be created at the same, single processing machine at which the insulation elbow processing instructions are implemented, allowing for a more efficient insulation elbow manufacturing process. In some embodiments, to implement the processing instructions to create the insulation elbow segments, the processing machine can include a non-transitory computer-readable storage article and a processor configured to execute computer-executable insulation elbow processing instructions stored at the non-transitory computer-readable storage article.

In one embodiment, a method of manufacturing an insulation elbow can include a step, prior to the step 110, of creating insulation elbow processing instructions. For example, as will be described in reference to FIG. 2, insulation elbow processing instructions for each insulation elbow segment can be derived from a digital model of the insulation elbow to be formed. Thus, one embodiment of a method of manufacturing an insulation elbow can include a step, prior to the step 110, of creating a digital model (e.g., a CAD, or "computer-aided design, drawing) of the insulation elbow to be formed and segmenting the digital model of the insulation elbow into a number of individual insulation elbow segments. These segmented individual insulation elbow segments in the digital model can then be used for insulation elbow processing instructions specifying features for each insulation elbow segment relating to the insulation elbow to be formed from the insulation elbow segments, such as one or more geometric features, for each insulation elbow segment, that are a function of the insulation elbow to be formed.

FIGS. 2A-2D illustrate an exemplary sequence of creating insulation elbow processing instructions. In particular, the illustrated exemplary sequences show the creation of a digital model of the insulation elbow to be formed and segmentation of the digital model of the insulation elbow into individual insulation elbow segments. These insulation elbow segments can then be used to create insulation elbow processing instructions for each insulation elbow segment.

Figure 2A:
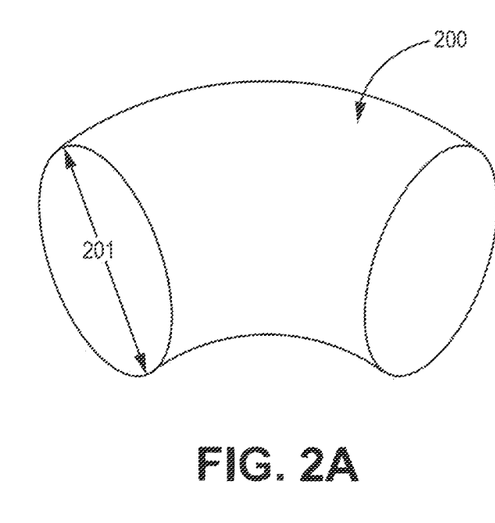
FIGS. 2A-2D illustrate an exemplary sequence of creating insulation elbow processing instructions.

FIG. 2A shows an initial stage in the sequence where an insulation elbow 200 is created as a solid piece. The solid piece insulation elbow 200 shown in FIG. 2A can be digitally created with dimensions as suited for a particular insulation elbow application. For instance, in FIG. 2A the solid piece insulation elbow 200 can have an outer diameter 201, length, and radius of curvature as specified for a particular insulation elbow. Specifically, this can include the solid piece insulation elbow 200 have one or more geometric features, such as the outer diameter 201, length, and radius of curvature as suited for installing the solid piece insulation elbow 200 around an outer surface of a conveyance elbow.

Figure 2B:
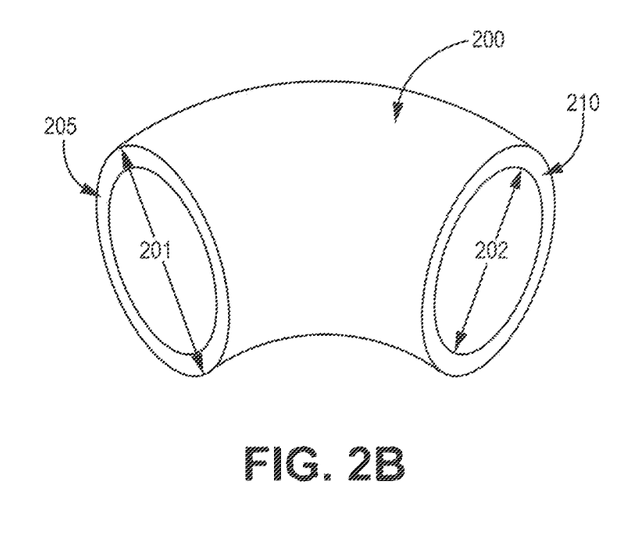

FIG. 2B shows a subsequent stage in the sequence where the insulation elbow 200 is hollowed out. The hollowed out insulation elbow 200 shown in FIG. 2B can be digitally created with dimensions as suited for a particular insulation elbow application. Here, in the exemplary sequence, the hollowed out insulation elbow 200 can be formed from the digitally created solid piece insulation elbow 200 of FIG. 2A by removing interior material of the insulation elbow 200 according to a specified inner diameter 202 for a particular insulation elbow. The insulation elbow 200 as shown in FIG. 2B can be a digital representation of an insulation elbow to be manufactured according to the method 100, and thus formed from a number of insulation elbow segments. For instance, the insulation elbow 200 can have a first end 205 configured to be installed around a first end of a conveyance elbow that is to attach to a first length of pipe and a second end 210 configured to be installed around a second end of a conveyance elbow that is to attach to a second length of pipe such that material can be conveyed through the conveyance elbow, via a conduit extending through the conveyance elbow within the inner diameter 202 of the insulation elbow 200.

Figure 2C:
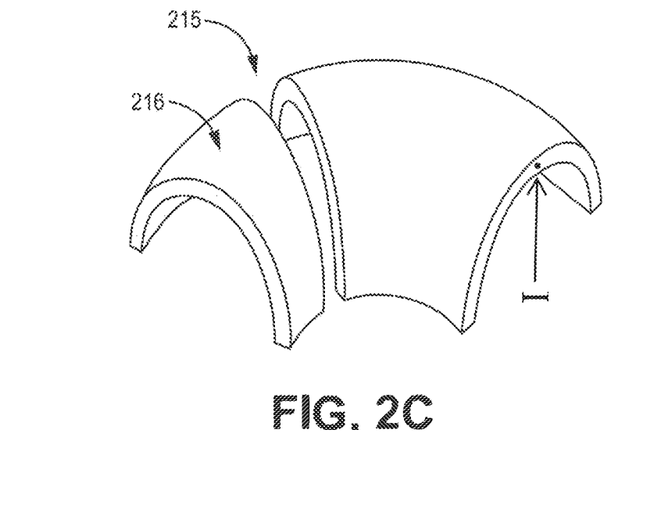

FIG. 2C shows a subsequent stage in the sequence where the insulation elbow 200 is split into two longitudinal halves, with one such longitudinal half 215 of the insulation elbow shown in FIG. 2C. The digital insulation elbow of FIG. 2B can be cut along its longitudinal axis so as to create two longitudinal halves, including the longitudinal half 215. The digital insulation elbow of FIG. 2B can also be cut into multiple radial elbow slices, with one such radial elbow slice 216 shown in FIG. 2C. In particular, in some cases, such as where the insulation elbow to be manufactured is made up of multiple layers of material, the digital insulation elbow of FIG. 2B can first be cut along its longitudinal axis so as to create two longitudinal halves, including longitudinal half 215, and then each such longitudinal half can be cut into multiple radial insulation elbow slices, including radial insulation elbow slice 216 resulting from a radial cut, in a direction perpendicular to the longitudinal axis of the digital insulation elbow, longitudinal half 215. In certain embodiments, the insulation elbow slice 216, and additional, similar resulting insulation elbow slices, can serve as the insulation elbow segments to be used for creating insulation elbow processing instructions.

Figure 2D:
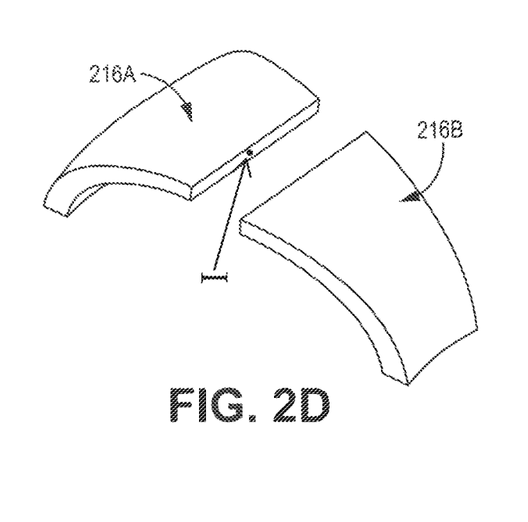

However, in some embodiments, the sequence can include additional segmentation to arrive at the insulation elbow segments to be used for creating insulation elbow processing instructions. FIG. 2D shows a subsequent stage in the sequence in which additional segmentation is performed. In particular, at the stage shown in FIG. 2D the radial insulation elbow slices, created at the stage in FIG. 2C, such as the radial insulation elbow slice 216, can be cut. As shown in FIG. 2D, in some examples the radial insulation elbow slices, such as the radial insulation elbow slice 216, can be cut in a direction perpendicular to the longitudinal axis of the digital insulation elbow to create insulation elbow segments 216A, 216B from the radial insulation elbow slice 216. As shown in the illustrated example, while the cuts at each of the stages in FIGS. 2C and 2D can be perpendicular to the longitudinal axis of the digital insulation elbow, the cut at the stage in FIG. 2D can be in a different direction than the cut at the stage in FIG. 2C.

Ultimately, some or all of the stages in the sequence shown in FIGS. 2A-2D with respect to the digital model of the insulation elbow can be used to arrive at multiple insulation elbow segments. From each of these multiple insulation elbow segments, insulation elbow processing instructions can be derived. For instance, insulation elbow processing instructions can be created using the insulation elbow segments 216A, 216B. Such insulation elbow processing instructions can include a first set of insulation elbow processing instructions corresponding to the first insulation elbow segment 216A and a second set of insulation elbow processing instructions corresponding to the second insulation elbow segment 216B. The first set of insulation elbow processing instructions can include features defining the first insulation elbow segment 216A as a function of the insulation elbow to be formed when the first insulation elbow segment is assembled with one or more other insulation elbow segments, such as length, width, thickness, radius of curvature in the longitudinal direction, and/or radius of curvature in the radial direction. Likewise, the second set of insulation elbow processing instructions can include features defining the second insulation elbow segment 216B as a function of the insulation elbow to be formed when the first insulation elbow segment is assembled with one or more other insulation elbow segments, such as length, width, thickness, radius of curvature in the longitudinal direction, and/or radius of curvature in the radial direction. In some cases, there can be a set of insulation elbow processing instructions for each insulation elbow segment making up the insulation elbow to be formed from these insulation elbow segments.

As described in reference to step 110 of the method 100 in FIG. 1, the insulation elbow processing instructions can be implemented. In doing so, at step 120, the method 100 includes creating insulation elbow segments according to the insulation elbow processing instructions.

In particular, as noted previously, at step 120 the insulation elbow processing instructions can be implemented at a processing machine to create each of the insulation elbow segments. For example, the processing machine can execute, via a processor, the insulation elbow processing instructions to cause the processing machine to work on raw material loaded at the processing machine in order to create the specified insulation elbow segments from the raw material. Namely, in one embodiment, the processing machine can execute, via a processor, the first set of insulation elbow processing instructions to form, from the raw material, features defining a first insulation elbow segment (e.g., corresponding to the first digital, segmented insulation elbow segment 216A) as a function of the insulation elbow to be formed when the first insulation elbow segment is assembled with one or more other insulation elbow segments. And, the processing machine can execute, via a processor, the second set of insulation elbow processing instructions to form, from the raw material, features defining a second insulation elbow segment (e.g., corresponding to the first digital, segmented insulation elbow segment 216B) as a function of the insulation elbow to be formed when the second insulation elbow segment is assembled with one or more other insulation elbow segments. Other sets of processing instructions can additionally be executed depending on the number of insulation elbow segments to be created.

In various embodiments, the processing machine may work on the raw material to form the insulation elbow segment from the raw material, such as by cutting (e.g., with a saw blade, laser, etc.) the raw material in one or more planes according to the dimensions of the insulation elbow segment specified in the insulation elbow processing instructions. In some embodiments, the processing machine could utilize additive manufacturing techniques using raw material in order to create the insulation elbow segment as specified in the insulation elbow processing instructions.

Depending on the number of insulation elbow segments making up an insulation elbow, in some embodiments, to form an insulation elbow, certain insulation elbow segments may be assembled with other insulation elbow segments at each of the insulation elbow segment's two longitudinal sides as well as at each of the insulation elbow segment's two radial sides.

In many embodiments, the method 100 can further include a step of marking two or more created insulation elbow segments with an insulation elbow segment identifier I. The insulation elbow segment identifier can provide an indicator as to an insulation elbow segment's assembly in forming the insulation elbow. For example, the insulation elbow segment identifier can represent a relative position of the particular insulation elbow segment having the insulation elbow segment identifier so that that particular insulation elbow segment may more easily be assembled along with other insulation elbow segments to form the insulation elbow. For example, each created insulation elbow segment can a unique insulation elbow segment identifier that represents each insulation elbow's unique position at an assembled insulation elbow. In some embodiments, an installation sheet can accompany the insulation elbow segments and provide directions referencing one or more insulation elbow segment identifiers for assembling the insulation elbow segments together to form the insulation elbow.

At step 130 of the method 100, once the insulation elbow segments have been created at step 120, the insulation elbow segments can be packaged.

Figure 3:
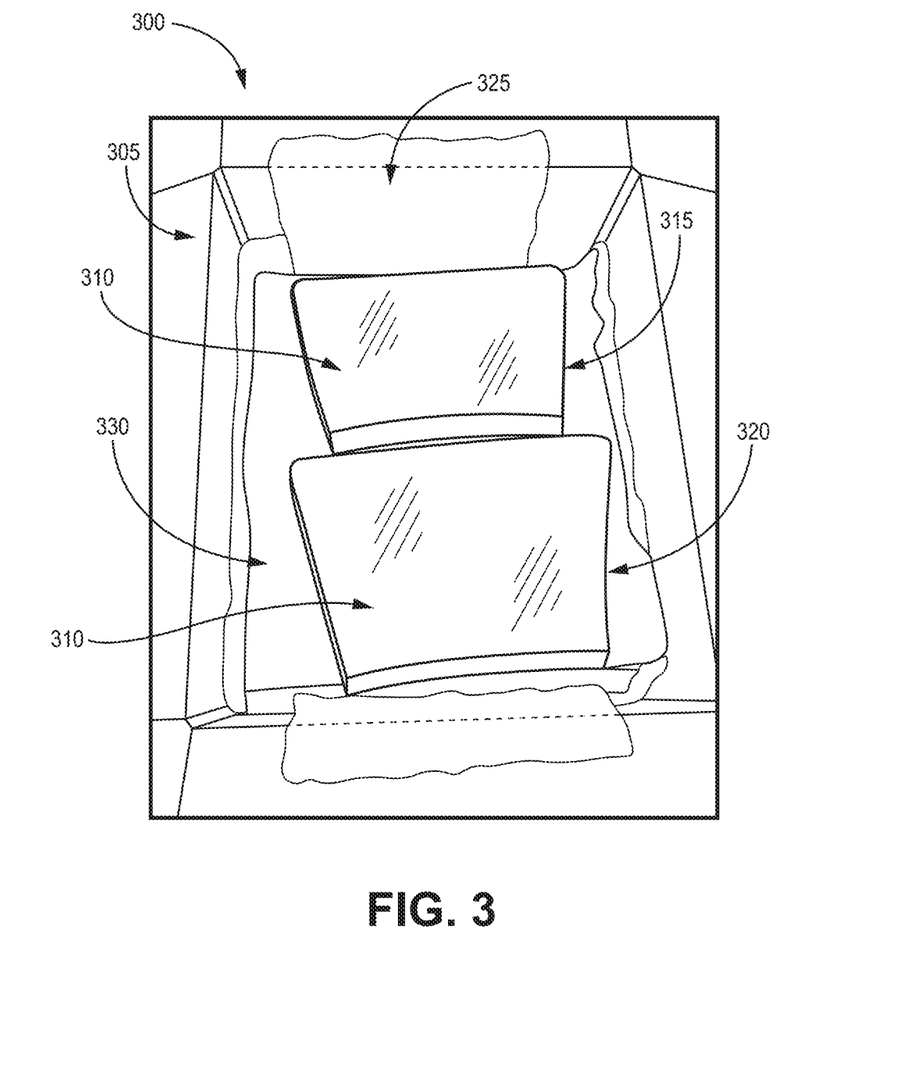
FIG. 3 is a perspective view of an exemplary embodiment of an insulation elbow segment packaging.

FIG. 3 illustrates a perspective view of an exemplary embodiment of an insulation elbow segment packaging 300 that can be packaged at step 130. As shown in the illustrated embodiment, the insulation elbow segment packaging 300 can include a package 305 and a number of insulation elbow segments 310, such as those created at step 120, placed within the package 305. As shown here, insulation elbow segments 310 can be stacked on top of one another and, in some cases, such as that shown here, the package 305 can include multiple, parallel columns 315, 320 each made up of a number of stacked insulation elbow segments 310. By creating insulation elbow segments as noted at step 120, packaging of the insulation elbow segments can be efficient due to the ability to place multiple individual insulation elbow segments within a single package 305.

In embodiments where insulation elbow segments have been marked with insulation elbow segment identifiers, the insulation elbow segments can be stacked in the package 305 in an order relative to the insulation elbow segment identifiers. In this way, insulation elbow segments that are to be assembled adjacent one another, and have similar insulation elbow segment identifiers, may be stacked adjacent one another within the package 305.

As also shown in FIG. 3, the package 305 can include packaging features that can help to protect the insulation elbow segments 310 from wear and/or damage, for instance during shipping. The package 305 can include a protective layer 325, such as bubble wrap or other material useful for absorbing contact, at the interior base of the package 305 and, in some examples, extending up at along one or more interior sides of the package 305. Also in the illustrated example, the package 305 can include a layer separator 330 located between stacked insulation elbow segments 310. In some cases, the layer separator 330 can extend across the columns 315, 320 between stacked insulation elbow segments 310.

Depending on the number of insulation elbow segments, multiple insulation elbow segment packagings can be created. Because of the creation of the insulation elbow segments, not only can a relatively large number of insulation elbow segments be placed in a single package 305, but a relatively large number of insulation elbow segment packagings can be fit onto a single pallet. This, in turn, can create substantial efficiencies in shipping insulation elbows.

Figure 4:
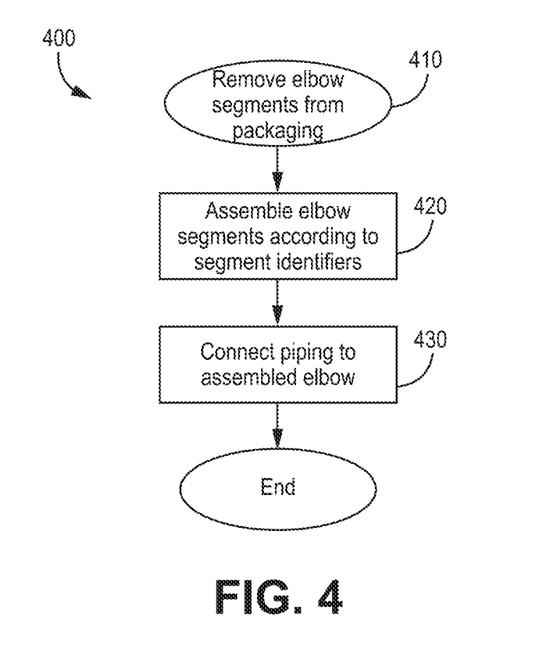
FIG. 4 is a flow diagram of an exemplary embodiment of a method of installing an insulation elbow.

FIG. 4 illustrates a flow diagram of an exemplary embodiment of a method 400 of installing an insulation elbow.

At step 410, the method 400 includes removing one or more insulation elbow segments from packaging. For example, this step can include removing multiple, individual insulation elbow segments from packaging, such as insulation elbow segment packaging described previously herein. Insulation elbow segments removed from packaging can be insulation elbow segments corresponding to a specified insulation elbow such that the insulation elbow segments removed from the packaging can together form the specified insulation elbow. For instance, in certain embodiments, all insulation elbow segments making up a specified insulation elbow can be removed from the same packaging. Insulation elbow segments removed from the packaging can include insulation elbow segment identifiers that provide an indicator as to an insulation elbow segment's assembly in forming the insulation elbow.

After step 410, at step 420, the method 400 includes assembling insulation elbow segments, removed from packaging, according to insulation elbow segment identifiers included on the insulation elbow segments. For example, at step 420, multiple insulation elbow segments can be assembled together to form an insulation elbow based on, at least in part, the insulation elbow segment identifiers on each of the multiple insulation elbow segments. The insulation elbow segments identifiers can provide an indication as to a specific insulation elbow for which each insulation elbow segment is to be used to assemble. In some further embodiments, the insulation elbow segments identifiers can provide an indication as to a relative positioning of each insulation elbow segment in the assembly of the specific insulation elbow. Assembling the insulation elbow segments can include placing two insulation elbow segments adjacent one another (e.g., based on an indication from the insulation elbow segment identifiers) and securing these two insulation elbow segments together to form at least a portion of the specific insulation elbow. Adhering the two insulation elbow segments together can including placing attachment material, such as adhesive or other binding matter, at the interface between adjacent insulation elbow segments such that the attachment material secures each such insulation elbow segment to the other. In alternate or additional embodiments, insulation elbow segments can include structural connection members configured to secure to corresponding structural connection members of one or more other insulation elbow segments such that adhering the two insulation elbow segments together can include connecting corresponding structural connection members of the two insulation elbow segments (e.g., via an interference fit therebetween).

Assembling insulation elbow segments at step 420 can include assembling insulation elbow segments at a conveyance elbow. For example, at step 420, two or more insulation elbow segments can be assembled at an outer surface (e.g., opposite to the conduit through which fluid can flow) of a conveyance elbow. Such two or more insulation elbow segments can be placed adjacent to one another at the outer surface of the conveyance elbow and secured together at the outer surface of the conveyance elbow.

In some embodiments, the method 400 can include an optional step 430. When included, at step 430, after the insulation elbow has been assembled from the insulation elbow segments, the method 400 can include connecting a conveyance line (e.g., piping) to a conveyance elbow at which the insulation elbow has been assembled. For example, the conveyance elbow can have two or more conveyance openings at which two or more conveyance lines can be connected. One conveyance line can be connected at one conveyance opening at one end the conveyance elbow and another conveyance line can be connected at another conveyance opening at another end of the conveyance elbow. In some cases, the conveyance elbow can include curvature between its ends at which the conveyance lines are to be connected. In such an example, the assembled insulation elbow at the conveyance elbow can include curvature matching that of the conveyance elbow.

Figure 5:
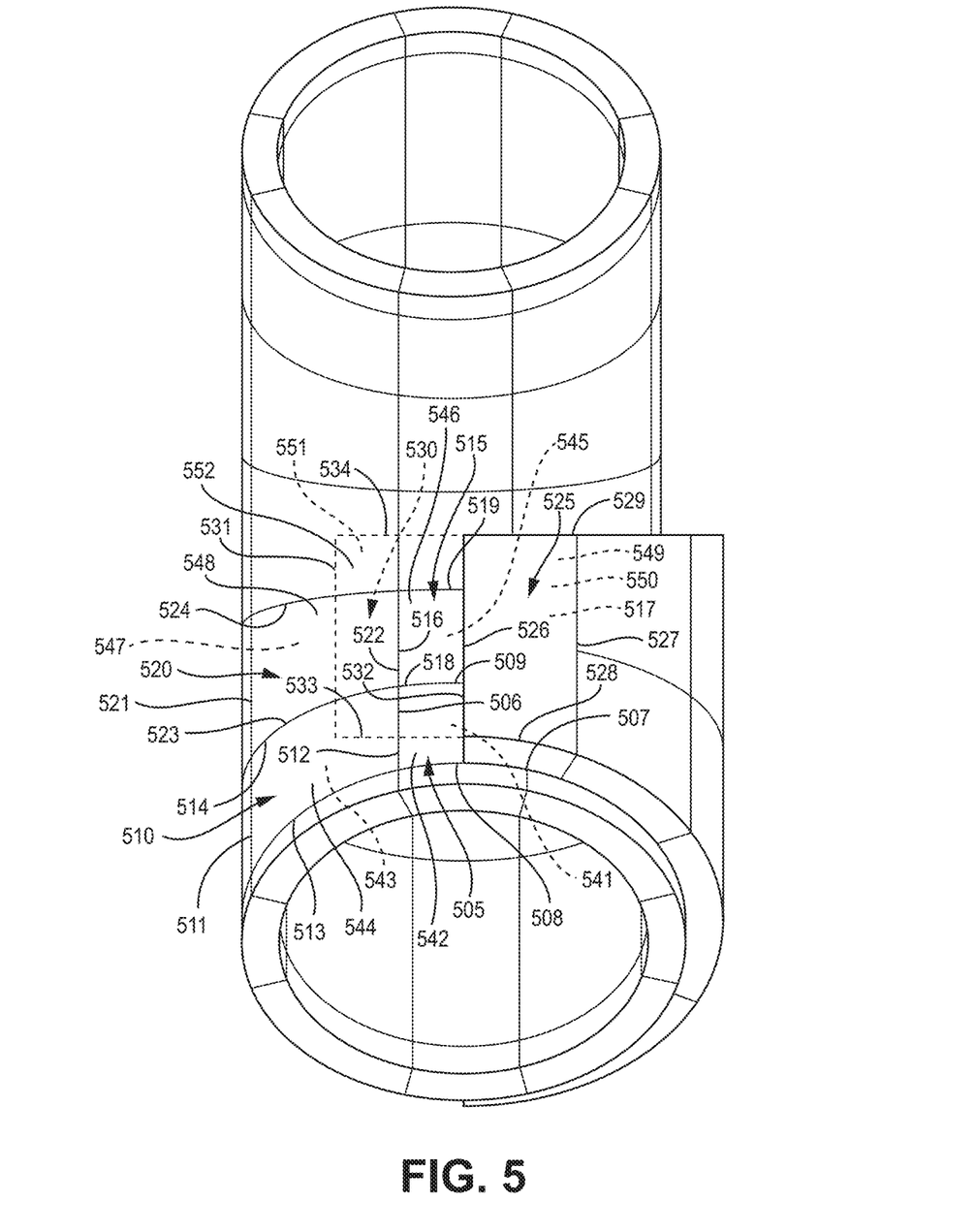
FIG. 5 is a perspective view of an exemplary embodiment of an insulation elbow assembly that can be installed around a conveyance line (e.g., a conveyance line elbow).

FIG. 5 is a perspective view of an exemplary embodiment of an insulation elbow assembly 500. The insulation elbow assembly 500 can be assembled around, and over, a conveyance line, such as an elbow of a conveyance line.

The insulation elbow assembly 500 includes a number of insulation elbow segments assembled together to form the insulation elbow assembly 500. For example, the insulation elbow assembly 500 shown here includes a first insulation elbow segment 505, a second insulation elbow segment 510, a third insulation elbow segment 515, and a fourth insulation elbow segment 520. In the illustrated embodiment, the first, second, third and fourth insulation elbow segments 505, 510, 515, 520 form, at least in part, a first insulation elbow layer. The insulation elbow assembly 500 shown here also includes a fifth insulation elbow segment 525 and a sixth insulation elbow segment 530. And, in the illustrated embodiment, the fifth and sixth insulation elbow segments 525, 530 form, at least in part, a second insulation elbow layer. The sixth insulation elbow segment 530 is shown here in dashed lines and as transparent in order to render visible underlying portions of the first, second, third and fourth insulation elbow segments 505, 510, 515, 520.

The first insulation elbow segment 505 can include a first segment first longitudinal side 506, a first segment second longitudinal side 507 opposite the first segment first longitudinal side 506, a first segment first radial side 508, a first segment second radial side 509 opposite the first segment first radial side 508, a first segment interior surface 541, and a first segment exterior surface 542 opposite the first segment interior surface 541.

The second insulation elbow segment 510 can include a second segment first longitudinal side 511, a second segment second longitudinal side 512 opposite the second segment first longitudinal side 511, a second segment first radial side 513, a second segment second radial side 514 opposite the second segment first radial side 513, a second segment interior surface 543, and a second segment exterior surface 544 opposite the second segment interior surface 543. As shown here, the second segment second longitudinal side 512 can be secured to the first segment first longitudinal side 506 to form a first segment-second segment joint.

The third insulation elbow segment 515 can include a third segment first longitudinal side 516, a third segment second longitudinal side 517 opposite the third segment first longitudinal side 516, a third segment first radial side 518, a third segment second radial side 519 opposite the third segment first radial side 518, a third segment interior surface 545, and a third segment exterior surface 546 opposite the third segment interior surface 545. The third segment first radial side 518 is secured to the first segment second radial side 509 to form a first segment-third segment joint.

The fourth insulation elbow segment 520 can include a fourth segment first longitudinal side 521, a fourth segment second longitudinal side 522 opposite the fourth segment first longitudinal side 521, a fourth segment first radial side 523, a fourth segment second radial side 524 opposite the fourth segment first radial side 523, a fourth segment interior surface 547, and a fourth segment exterior surface 548 opposite the fourth segment interior surface 547. The fourth segment second longitudinal side 522 is secured to the third segment first longitudinal side 516 to form a third segment-fourth segment joint. And, the fourth segment first radial side 523 is secured to the second segment second radial side 514 to form a second segment-fourth segment joint.

The fifth insulation elbow segment 525 can include a fifth segment first longitudinal side 526, a fifth segment second longitudinal side 527 opposite the fifth segment first longitudinal side 526, a fifth segment first radial side 528, a fifth segment second radial side 529 opposite the fifth segment first radial side 528, a fifth segment interior surface 549, and a fifth segment exterior surface 550 opposite the fifth segment interior surface 549.

The sixth insulation elbow segment 530 can include a sixth segment first longitudinal side 531, a sixth segment second longitudinal side 532 opposite the sixth segment first longitudinal side 531, a sixth segment first radial side 533, a sixth segment second radial side 534 opposite the sixth segment first radial side 533, a sixth segment interior surface 551, and a sixth segment exterior surface 552 opposite the sixth segment interior surface 551. The sixth segment second longitudinal side 532 is secured to the fifth segment first longitudinal side 526 to form a fifth segment-sixth segment joint. As also shown here, the fifth segment interior surface 549 is positioned over at least a portion of the first segment exterior surface 542, and the sixth segment interior surface 551 is positioned over at least a portion of the second segment exterior surface 544.

The insulation elbow segments can be assembled together to form the insulation elbow assembly 500 such that one or more (e.g., each) of the joints between insulation elbow segments is offset from other joints of the insulation elbow assembly 500. In some embodiments, the joints between insulation elbow segments can be offset from other joints of the insulation elbow assembly 500 by at least a minimum offset distance, such as one inch, two inches, three inches, four inches, five inches, or other appropriate minimum offset distance as suited for a specific application.

For example, for the illustrated example of the insulation elbow assembly 500, all joints between insulation elbow segments of the first layer are offset from all joints between insulation elbow segments of the second layer such that no two joints of the two overlaying layers overlap with one another. For instance, as shown here, the fifth segment-sixth segment joint (formed where the sixth segment second longitudinal side 532 is secured to the fifth segment first longitudinal side 526) is offset from each of the first segment-second segment joint (formed where the second segment second longitudinal side 512 is secured to the first segment first longitudinal side 506) and the third segment-fourth segment joint (formed where the fourth segment second longitudinal side 522 is secured to the third segment first longitudinal side 516).

As described elsewhere herein, each of the first insulation elbow segment 505, the second insulation elbow segment 510, the third insulation elbow segment 515, and the fourth insulation elbow segment 520 can include an insulation elbow segment identifier that indicates a location of the respective insulation elbow segment, 505, 510, 515, 520, relative to the insulation elbow assembly 500. Likewise, as described elsewhere herein, each of the first insulation elbow segment 525 and the sixth insulation elbow segment 520 can include an insulation elbow segment identifier that indicates a location of the respective insulation elbow segment, 520, 525, relative to the insulation elbow assembly 500. As such, the insulation elbow segment identifier on the respective insulation elbow segment can indicate both at which layer the respective insulation elbow segment is to be assembled and where the respective insulation elbow segment is to be assembled in that particular layer (e.g., relative to one or more other insulation elbow segments of that same layer).

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. An insulation elbow assembly comprising:
    a first insulation elbow segment having a first segment first longitudinal side, a first segment second longitudinal side opposite the first segment first longitudinal side, a first segment first radial side, a first segment second radial side opposite the first segment first radial side, a first segment interior surface, and a first segment exterior surface opposite the first segment interior surface;
    a second insulation elbow segment having a second segment first longitudinal side, a second segment second longitudinal side opposite the second segment first longitudinal side, a second segment first radial side, a second segment second radial side opposite the second segment first radial side, a second segment interior surface, and a second segment exterior surface opposite the second segment interior surface, wherein the second segment second longitudinal side is secured along an entire length of the second segment second longitudinal side to the first segment first longitudinal side along an entire length of the first segment second longitudinal side to form a first segment-second segment joint;
    a third insulation elbow segment having a third segment first longitudinal side, a third segment second longitudinal side opposite the third segment first longitudinal side, a third segment first radial side, a third segment second radial side opposite the third segment first radial side, a third segment interior surface, and a third segment exterior surface opposite the third segment interior surface, wherein the third segment first radial side is secured to the first segment second radial side to form a first segment-third segment joint;
    a fourth insulation elbow segment having a fourth segment first longitudinal side, a fourth segment second longitudinal side opposite the fourth segment first longitudinal side, a fourth segment first radial side, a fourth segment second radial side opposite the fourth segment first radial side, a fourth segment interior surface, and a fourth segment exterior surface opposite the fourth segment interior surface, wherein the fourth segment second longitudinal side is secured along an entire length of the fourth segment fourth segment longitudinal side to the third segment first longitudinal side along entire length of the third segment second longitudinal side to form a third segment-fourth segment joint, and wherein the fourth segment first radial side is secured to the second segment second radial side to form a second segment-fourth segment joint;
    a fifth insulation elbow segment having a fifth segment first longitudinal side, a fifth segment second longitudinal side opposite the fifth segment first longitudinal side, a fifth segment first radial side, a fifth segment second radial side opposite the fifth segment first radial side, a fifth segment interior surface, and a fifth segment exterior surface opposite the fifth segment interior surface; and
    a sixth insulation elbow segment having a sixth segment first longitudinal side, a sixth segment second longitudinal side opposite the sixth segment first longitudinal side, a sixth segment first radial side, a sixth segment second radial side opposite the sixth segment first radial side, a sixth segment interior surface, and a sixth segment exterior surface opposite the sixth segment interior surface, wherein the sixth segment second longitudinal side is secured to the fifth segment first longitudinal side to form a fifth segment-sixth segment joint;
    wherein each of the fifth segment first longitudinal side and the sixth segment first longitudinal side is longer than each of the first segment first longitudinal side, second segment first longitudinal side, third segment first longitudinal side and fourth segment first longitudinal side, wherein the first insulation elbow segment, the second insulation elbow segment, the third insulation elbow segment, and the fourth insulation elbow segment form a first insulation elbow layer, and wherein the fifth insulation elbow segment and the sixth insulation elbow segment form a second insulation layer that is positioned over the first insulation elbow layer.

2. The assembly of claim 1, wherein the fifth segment interior surface is positioned over at least a portion of the first segment exterior surface, and wherein the sixth segment interior surface is positioned over at least a portion of the second segment exterior surface.

3. The assembly of claim 2, wherein the fifth segment-sixth segment joint is offset from each of the first segment-second segment joint and the third segment-fourth segment joint.

4. The assembly of claim 1, wherein each of the first insulation elbow segment, the second insulation elbow segment, the third insulation elbow segment, and the fourth insulation elbow segment includes an insulation elbow segment identifier that indicates a location of the respective insulation elbow segment relative to the insulation elbow assembly.

5. The assembly of claim 1 wherein the fifth segment second longitudinal side is secured along an entire length of the fifth segment segment longitudinal side to the sixth segment first longitudinal side along entire length of the sixth segment second longitudinal side.

* * * * *